United States Patent
Oroskar et al.

(10) Patent No.: US 9,942,412 B1
(45) Date of Patent: Apr. 10, 2018

(54) USE OF CONTENTION-FREE RANDOM-ACCESS PREAMBLE IN PAGING PROCESS

(71) Applicant: Sprint Spectrum L.P., Overland Park, KS (US)

(72) Inventors: Siddharth S. Oroskar, Overland Park, KS (US); Jasinder P. Singh, Olathe, KS (US); Maulik K. Shah, Austin, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 425 days.

(21) Appl. No.: 14/480,088

(22) Filed: Sep. 8, 2014

(51) Int. Cl.
*H04W 74/00* (2009.01)
*H04W 72/04* (2009.01)
*H04M 7/00* (2006.01)
*H04W 74/08* (2009.01)
*H04W 68/02* (2009.01)

(52) U.S. Cl.
CPC ......... *H04M 7/0093* (2013.01); *H04W 68/02* (2013.01); *H04W 72/0453* (2013.01); *H04W 74/008* (2013.01); *H04W 74/0833* (2013.01); *H04W 72/042* (2013.01); *H04W 72/0413* (2013.01)

(58) Field of Classification Search
CPC ... H04W 36/16; H04W 68/005; H04W 68/02; H04W 74/006; H04W 74/008; H04W 74/04; H04W 68/00; H04W 72/0413; H04W 74/0866; H04W 72/042; H04W 74/08; H04W 72/0453; H04W 74/0833; H04W 76/02
See application file for complete search history.

(56) References Cited

U.S. PATENT DOCUMENTS

| | | | |
|---|---|---|---|
| 5,650,770 | A | 7/1997 | Schlager et al. |
| 5,940,743 | A | 8/1999 | Sunay et al. |
| 5,963,130 | A | 10/1999 | Schlager et al. |
| 6,002,664 | A | 12/1999 | Schachter |
| 6,154,638 | A | 11/2000 | Cheng et al. |
| 6,198,390 | B1 | 3/2001 | Schlager et al. |
| 6,243,575 | B1 | 6/2001 | Ohyama et al. |
| 6,307,846 | B1 | 10/2001 | Willey |
| 6,341,224 | B1 | 1/2002 | Dohi et al. |

(Continued)

FOREIGN PATENT DOCUMENTS

| | | | |
|---|---|---|---|
| WO | WO 2006044714 | 4/2006 | |
| WO | WO 2015094057 A1 * | 6/2015 | ........ H04W 52/0216 |

OTHER PUBLICATIONS

3GPP TS 36.410 v8.0.0 (Dec. 2007).*

(Continued)

*Primary Examiner* — Olumide T Ajibade Akonai (57) ABSTRACT

Disclosed is a method and system to help ensure contention-free response to a paging message. As disclosed, when a base station transmits a paging message for receipt by a UE, the base station includes in the paging message a contention-free random-access preamble useable by the UE to engage in contention-free random access in response to the paging message. The UE thus receives the paging message and responsively engages in a contention-free random access process with the base station, to establish a radio-link-layer connection between the UE and the base station.

13 Claims, 5 Drawing Sheets

(56) References Cited

U.S. PATENT DOCUMENTS

| | | |
|---|---|---|
| 6,442,393 B1 | 8/2002 | Hogan |
| 6,463,286 B1 | 10/2002 | Salminen |
| 6,490,460 B1 | 12/2002 | Soliman |
| 6,496,531 B1 | 12/2002 | Kamel et al. |
| 6,535,736 B1 | 3/2003 | Balogh et al. |
| 6,603,976 B1 | 8/2003 | Amirijoo et al. |
| 6,609,008 B1 | 8/2003 | Whang et al. |
| 6,754,501 B1 | 6/2004 | McRae et al. |
| 6,763,244 B2 | 7/2004 | Chen et al. |
| 6,845,245 B2 | 1/2005 | Hunzinger |
| 6,845,246 B1 | 1/2005 | Steer |
| 6,845,248 B1 | 1/2005 | Johnson |
| 6,968,201 B1 | 11/2005 | Gandhi et al. |
| 7,010,329 B2 | 3/2006 | Livet et al. |
| 7,024,217 B2 | 4/2006 | Hunzinger |
| 7,149,535 B1 | 12/2006 | Chaturvedi et al. |
| 7,215,653 B2 | 5/2007 | Kim et al. |
| 7,221,653 B2 | 5/2007 | Vanghi |
| 7,228,134 B2 | 6/2007 | Gandhi et al. |
| 7,260,415 B1 | 8/2007 | Oh |
| 7,356,346 B2 | 4/2008 | Gopalakrishnan et al. |
| 7,421,248 B1 | 9/2008 | Laux et al. |
| 7,466,682 B1 | 12/2008 | Ribas et al. |
| 7,480,501 B2 | 1/2009 | Petite |
| 7,636,322 B1 | 12/2009 | Gandhi et al. |
| 7,668,561 B2 | 2/2010 | Au et al. |
| 8,089,879 B2 | 1/2012 | Hu et al. |
| 8,194,562 B1 | 6/2012 | Gandhi et al. |
| 8,254,874 B1 | 8/2012 | Oroskar et al. |
| 8,509,699 B1 | 8/2013 | Wurtenberger et al. |
| 8,811,311 B2 * | 8/2014 | Huang ............... H04W 74/08 370/329 |
| 8,982,827 B2 * | 3/2015 | Lee ..................... H04W 74/006 370/329 |
| 2002/0123362 A1 | 9/2002 | Kamel et al. |
| 2003/0076804 A1 | 4/2003 | Sivalingham |
| 2004/0157626 A1 | 8/2004 | Park et al. |
| 2004/0165529 A1 | 8/2004 | Lee |
| 2006/0116151 A1 | 6/2006 | Sullivan et al. |
| 2006/0142051 A1 | 6/2006 | Purnadi et al. |
| 2006/0268768 A1 | 11/2006 | Harris et al. |
| 2007/0049314 A1 | 3/2007 | Balachandran et al. |
| 2007/0149235 A1 | 6/2007 | Chin et al. |
| 2008/0004050 A1 | 1/2008 | Bi et al. |
| 2008/0146253 A1 | 6/2008 | Wentink |
| 2009/0262681 A1 * | 10/2009 | Park ................. H04W 74/0866 370/328 |
| 2010/0111028 A1 * | 5/2010 | Kim .................. H04W 56/0005 370/329 |
| 2012/0122459 A1 * | 5/2012 | Wu .................... H04W 36/0022 455/437 |
| 2012/0184306 A1 * | 7/2012 | Zou ..................... H04W 76/023 455/458 |
| 2014/0233538 A1 * | 8/2014 | Zhang ............... H04W 72/1205 370/336 |
| 2014/0334389 A1 * | 11/2014 | Abdel-Samad ....... H04W 76/07 370/329 |
| 2017/0034853 A1 * | 2/2017 | Rune ................. H04W 52/0216 |

OTHER PUBLICATIONS

3rd Generation Partnership Project 2, "cdma2000 High Rate Packet Data Air Interface," 3GPP2 C.S0024-B, v. 2.0 (Mar. 2007).

ShareTechnote, "Handover," http://www.sharetechnote.conn/html/Handover_LTE.html@CellChange, printed from the World Wide Web on Sep. 2, 2014.

"LTE in Wireless," http://lteinwireless.blogspot.conn/2011/04/rach-procedure.html, printed from the World Wide Web on Sep. 2, 2014.

* cited by examiner

USE OF CONTENTION-FREE RANDOM-ACCESS PREAMBLE IN PAGING PROCESS

BACKGROUND

Unless otherwise indicated herein, the description in this section is not prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices (whether or not operated by a human user), can operate. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to mobile terminals defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1xRTT and 1xEV-DO), Wireless Interoperability for Microwave Access (WiMAX), and Global System for Mobile Communications (GSM), among others. Each protocol may define its own procedures for registration of mobile terminals, initiation of communications, handover between coverage areas, and other functions related to air interface communication.

In accordance with the air interface protocol, each coverage area may operate on one or more carrier frequencies or range of carrier frequencies. Further, each coverage area may define a number of channels or specific resources for carrying signals and information between the base station and UEs. For instance, certain resources on the downlink may be reserved to carry a pilot or reference signal that UEs may detect as an indication of coverage and may measure to evaluate coverage quality. Further, certain resources on the uplink may be reserved to carry access requests from UEs seeking to gain access to the base station. And certain resources on the downlink may be reserved to carry control messaging such as paging messages and random access response messages from the base station. In addition, certain resources on the uplink and downlink may be set aside to carry bearer traffic (e.g., user communications) in a manner assigned or scheduled by the station for instance.

When a UE is within coverage of a base station, the UE may from time to time transmit to the base station an access request message. The purpose of such an access request message may depend on the air interface protocol and the circumstances. By way of example, a UE may transmit an access request as a request to gain initial access to communicate with a base station, such as to transition from an idle state to a connected state for instance, or to facilitate handover to the base station. As another example, a UE may transmit an access request as a response to a paging message and/or as a request to establish a particular communication connection such as a call or data session. And as still another example, a UE may transmit an access request to register or reregister with a base station and/or to provide a location or tracking area update. Once the base station receives a UE's access request, perhaps after further processing by the base station and/or associated infrastructure, the base station may then transmit an access response message to the mobile terminal.

By way of example, an access request that a UE transmits to a base station may comprise a preamble that takes the form of a signature or pattern randomly selected from a plurality of preambles. For instance, in an LTE system, 64 such preambles are available, and the UE may randomly select one of the preambles to transmit to the base station on an uplink random access channel (RACH). Since multiple UEs may be transmitting access requests at the same time, the preamble may serve to differentiate the access request transmitted by the UE from other access requests transmitted by other UEs.

In LTE, a UE's preamble transmission does not identify the UE but rather serves to notify the base station generally that a UE is trying to gain access. In response to receiving such a preamble, the base station then transmits a random access response for receipt by whichever UE happened to have sent the preamble (associating the response with the transmitted preamble and/or with associated timing or other attributes, to enable the UE at issue to receive the response to its access request), and the random access response provides that UE with a temporary identifier (T-CRNTI) and an initial assignment of uplink shared channel (PUSCH) resources on which the UE can then transmit a request for a radio-link-layer connection with the base station. Thus, upon receiving that initial assignment of uplink resources, the UE then uses the initial PUCH resource allocation to transmit to the base station a radio-link-layer connection request (Radio Resource Configuration (RRC) Connection request) that carries the provided temporary identifier so that the base station can associate the request with the access-process underway, and that carries the UE's actual identifier so as to inform the base station which particular UE is actually making the access request. And in response, the base station then assigns to the UE a full identifier (C-RNTI) for a radio-link-layer connection between the UE and base station, so that the UE can then engage in further air interface communication with the base station via that radio-link-layer connection.

OVERVIEW

When a UE transmits a random access preamble to a base station, the UE does not have a specific air interface resource that is allocated to the UE for use to transmit that preamble. Rather, the UE transmits the preamble on an air interface resource that is simultaneously shared with other mobile terminals, such as a shared RACH. Optimally, the process of the UE randomly selecting the preamble from a set of numerous preambles (e.g., from a set of 64 preambles, in LTE) may help to reduce the likelihood that another UE would select and send the same preamble at the same time. However, there is still a chance that two UEs may randomly select and send the same preamble at the same time. When that happens, an access contention process may occur.

In an example access contention process, in LTE for instance, the base station either receives the preamble transmitted by both UEs, or the base station does not receive the preamble transmission at all (e.g., due to air interface conflict between the transmissions). If the base station does not receive either transmission, then neither UE will receive a random access response from the base station, and so both UEs may consider the access process to have failed. Whereas, if the base station receives the transmission, the base station would consider the transmission to be from a single UE as normal (as the transmission would not identify any particular UE but would rather, as noted above, merely serve to indicate to the base station that some UE is attempting to gain access). The base station would then transmit a random access response for receipt by whichever UE sent the preamble, and as noted above, that random access response would carry a T-CRNTI and an initial uplink resource grant. However, at this point, both UEs may consider that random access response to be for them individually (since neither knows that the other transmitted the same preamble concurrently), and so both UEs may then transmit to the base station a radio-link-layer connection request, each providing the transmitting UE's actual. At that point, the base station may then select one of the two UEs to receive a radio-link-layer connection, and the base station may assign a C-RNTI to that selected UE. The selected UE may then engage in radio-link-layer communication with the base station. Whereas, the other UE may consider the access process to have failed.

As noted above, one of the reasons a UE may transmit an access request to a base station is to respond to a paging message from the base station. In practice, a base station may transmit a paging message to a UE in order to trigger establishment or restoration of a radio-link-layer connection between the UE and the base station, so as to enable the UE to then engage in further radio-link-layer communication with the base station. This process may occur, for instance, when the base station and/or associated network infrastructure has a call, data, or other communication to provide to the UE. In that scenario, the base station may page the UE, and, once the UE has a radio-link-layer connection with the base station, the base station may then provide the call, data, or other communication to the UE via the radio-link-layer connection. Alternatively, this process may occur when another network (e.g., a network operating on a different radio access technology than the base station at issue) has a call, data, or other communication to provide to the UE. In that scenario, once the UE has a radio-link-layer connection with the base station, the UE may then engage in signaling via the radio-link-layer connection to facilitate transition of the UE to be served by the other network so as to receive the communication. This latter scenario may occur to facilitate circuit-switched-fallback for instance.

Considering that paging of a UE triggers a random access process such as that described above, there is unfortunately also a chance that access contention may occur when the UE engages in the random access process in response to receipt of a paging message. If access contention occurs in that scenario, there is then also a chance that the UE's access process may fail as described above. In turn, such access failure may then cause the base station to re-page the UE, in a further effort to establish a radio-link-layer connection with the UE so that the base station can still provide the communication at issue to the UE. Unfortunately, however, such re-paging of the UE may consume limited paging channel resources on the air interface and is therefore generally undesirable. Therefore, an improvement is desired.

Disclosed herein is an advance to help avoid access contention when responding to a paging message. In accordance with the disclosure, when a base station transmits a paging message for receipt by a UE (e.g., broadcasts the paging message for the UE on a downlink paging channel), the base station will include in the paging message (e.g., as a parameter value provided with the paging message) a contention-free random-access preamble useable by the UE to engage in contention-free random access in response to the paging message.

The contention-free random-access preamble may be of a type that would normally be provided by a target base station to a source base station in a handover process, for use by the UE served by the source base station to seamlessly gain access to the target base station. However, here, the contention-free random-access preamble is being provided by a particular base station to a UE in a paging message that the particular base station is sending to that UE to enable the UE to gain access to the particular base station in response to the paging message, rather than to enable the UE to gain access to another (e.g., target) base station in a handover process.

As such, the base station may have a reserved set of contention-free random-access preambles (e.g., a proper subset of all possible preambles) that the base station can assign on an as-needed basis, and that UEs generally do not use unless specifically directed to do so, thus limiting use of such a preamble to just one UE at a time and thereby avoiding contention. When the base station is going to page a UE, the base station may thus select one of those contention-free random-access preambles and provide the preamble to the UE so that the UE can use that contention-free random-access preamble when engaging in a random access process with the base station in response to the paging message.

Accordingly, in one respect, disclosed is a method operable by a base station in a wireless communication system, where the base station is configured to serve UEs over an air interface. In accordance with the method, the base station broadcasts over the air interface a paging message destined to a particular UE, to cause the UE to responsively engage in a random-access process with the base station in order to establish a radio link layer connection between the UE and the base station. Further, the base station includes in the broadcast message a contention-free random-access preamble for use by the UE to facilitate contention-free random access by the UE in that random-access process.

In another respect, disclosed is a method operable by a UE in such a system. In accordance with the method, the UE wirelessly receives over an air interface, from a base station, a paging message that includes a contention-free random-access preamble. Further, in response to receipt of the paging message, the UE engages in a random-access process to establish a radio-link-layer connection between the UE and the base station. And in response to inclusion of the contention-free random-access preamble in the received paging message, the UE uses the contention-free random-access preamble in the random-access process to facilitate contention-free random access for establishing the radio-link-layer connection between the UE and the base station.

Still further, disclosed is a base station that includes a wireless communication interface configured to engage in air interface communication, a backhaul interface configured to engage in backhaul communication (e.g., bearer and signaling communication), and a controller configured to cause the base station to carry out various base station functions described herein. In particular, the controller is configured to receive, via the backhaul interface, a paging message destined to a particular UE, to add into the received paging message a contention-free random-access preamble, and to broadcast the paging message including the added contention-free random-access preamble, via the wireless communication interface, for receipt of the paging message by the UE. Advantageously, as discussed above, the contention-free random-access preamble is useable by the UE to engage in a contention-free random access process to establish a radio-link-layer connection between the UE and the base station in response to the paging message.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which features of the present disclosure can be implemented. It should be understood, however, that this and other arrangements described herein are set forth only as examples. As such, those skilled in the art will appreciate that other arrangements and elements (e.g., machines, interfaces, functions, orders, and grouping of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software.

Figure 1:
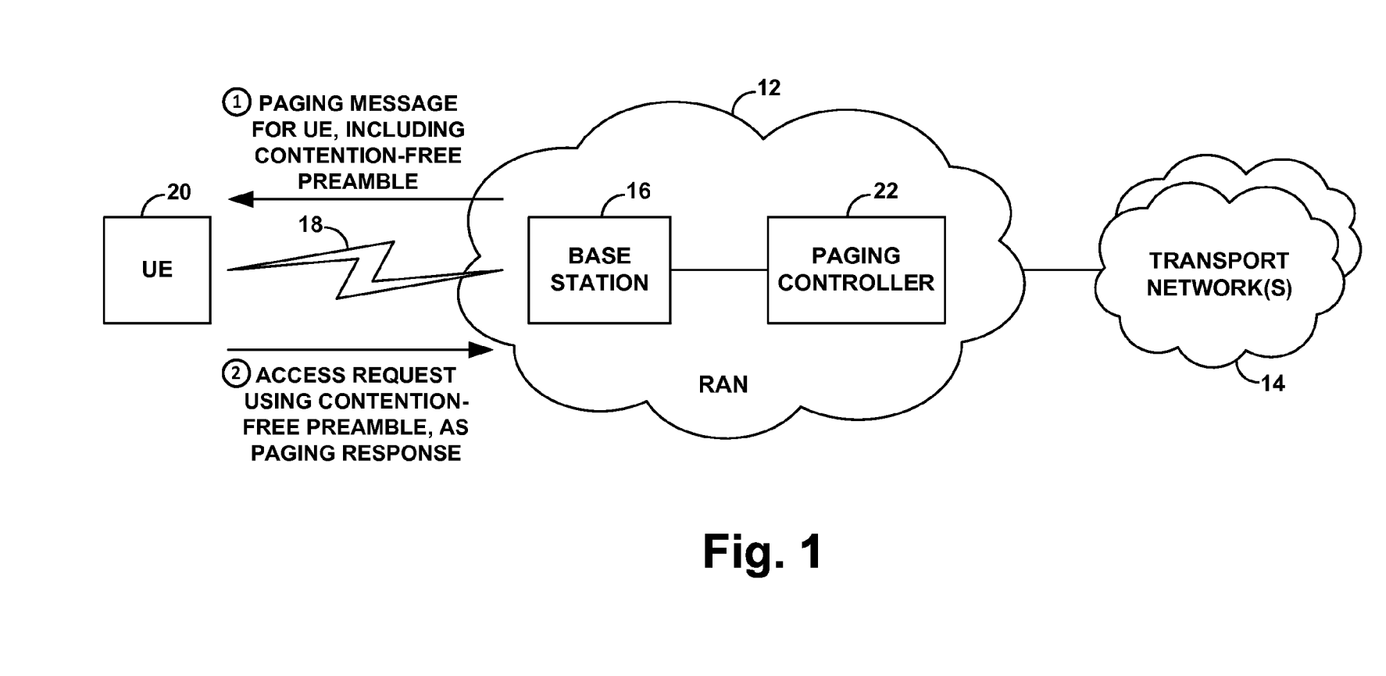
FIG. 1 is a simplified block diagram of an example wireless communication system in which features of the present disclosure can be implemented.

FIG. 1 depicts the example communication system that includes at its core a radio access network (RAN) 12 configured to provide UEs with access to one or more transport networks 14 such as the PSTN and the Internet for instance. Shown within the example RAN is a then a representative base station 16, which is configured to provide a coverage area defining an air interface 18 over which the base station serves UEs such as a representative UE 20. Further, the base station is also shown coupled with a paging controller 22, which could be a switch, gateway, mobility management entity (MME), or other entity that might deliver paging messages and/or paging directives to the base station to cause the base station to page UEs.

With this simplified arrangement, as shown, the base station may broadcast a paging message over air interface 18 for receipt by a particular UE. In practice, for instance, the base station might do this for various reasons, such as any of the reasons discussed above for instance. Further, as shown, the base station may include in the paging message a contention-free preamble, which is useable by the UE to engage in a contention-free random-access process in response to the paging message. Thus, as further shown, after the base station transmits the paging message including the contention-free preamble, the UE then uses the contention-free preamble as a basis to engage in contention-free random access, thereby helping to ensure lack of contention for the UE's paging response.

Figure 2:
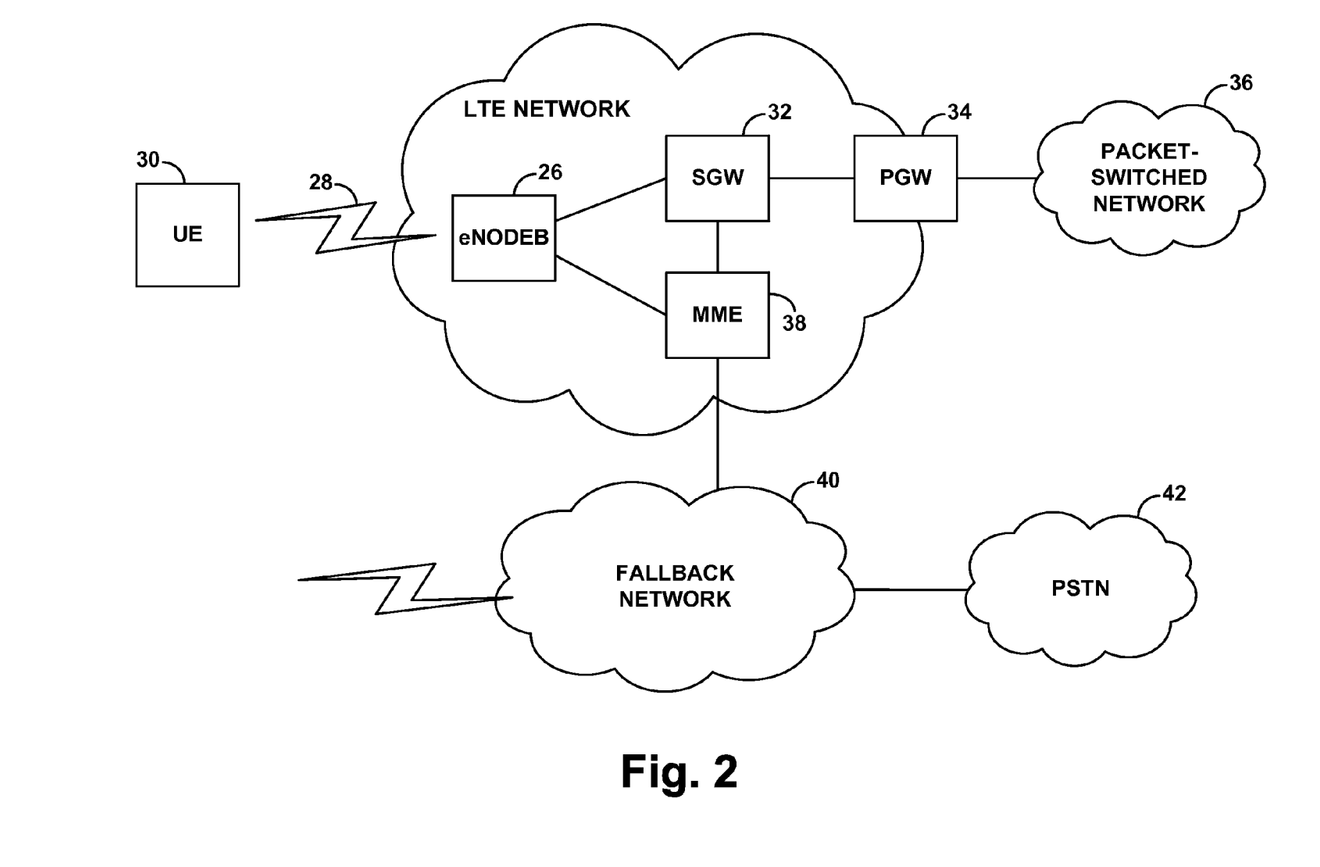
FIG. 2 is a more specific, but still simplified, block diagram of an example wireless communication system in which features of the present disclosure can be implemented.

FIG. 2 next depicts a more specific communication system to help illustrate how an example of this process can operate in practice. In particular, FIG. 2 depicts a representative LTE network 24 including an eNodeB (LTE base station) 26 that radiates to provide a coverage area defining an LTE air interface 28 in which the eNodeB is configured to serve UEs such as a representative UE 30. The eNodeB is then further shown having an interface with a serving gateway (SGW) 32 that in turn has an interface with a packet data network gateway (PGW) 34 providing connectivity with a packet-switched network 36 such as the Internet. Further, the eNodeB is also shown having an interface with an MME 38 that in turn also has an interface with the SGW 32. In practice, components of the LTE network in this arrangement (such as the eNodeB, SGW, PGW, and MME) may sit as nodes on a core packet-switched network owned and operated by an LTE service provider, and thus the interfaces between the components could be logical communication interfaces on that packet-switched network.

Additionally shown in FIG. 2 is also another network 40, depicted by way of example as a "fallback" network of the type that could be used to provide circuit-switched fallback service for a UE served by the LTE network. The fallback network could provide CDMA or GSM service for instance, to facilitate circuit-switched voice call service for UEs served by the LTE network, with call setup signaling passing between the networks for example. As shown, network 40 may thus provide connectivity with the PSTN 42 and/or another such transport network, and has a communication interface with the LTE network, such as with MME 36 for instance.

With this arrangement, UE 30 may be attached (registered) with the LTE network and particularly with eNodeB 26, but may be operating in an idle state, meaning that the UE does not currently have a radio-link-layer connection with the eNodeB over which to engage in UE-specific bearer data communication. In that state, the UE may operate in a discontinuous mode in which the UE operates with low power but periodically wakes up to check a downlink air interface control channel for a paging message. In particular, the LTE downlink defines frames of 10 milliseconds each divided into subframes of 1 millisecond each, and the UE may be configured to periodically check a "paging occasion" of the control channel in a particular frame and particular subframe in search of a paging indicator and, upon finding such a paging indicator, to then check a corresponding downlink shared channel space to see if there is a paging message for the UE. To transmit a paging message to the UE, the eNodeB may thus set the paging indicator in a paging occasion that the UE is set to check and may include in the corresponding downlink shared channel space the paging message for the UE. In LTE, the paging message that an eNodeB transmits to a UE includes various fields to provide various information, such as the UE identity, a type of the page message, and may be extensible.

In line with the discussion above, eNodeB 26 may page UE 30 in various scenarios. By way of example, if SGW 32 receives (from PGW 34) packet data for transmission to the UE, the SGW may transmit to MME 38 a data-notification message, and the MME may responsively generate a paging message for the UE and transmit the paging message to each eNodeB in a registered tracking area of the UE, including to eNodeB 26. The eNodeB may thus receive such from the MME the paging message destined to the UE and responsively broadcast the paging message in the manner described above. As another example, if network 40 has a call to connect to UE 30, a control node of network 40 (such as a mobile switching center) may generate a paging message for the UE and transmit the paging message via an interworking server to the LTE network. MME 36 may then receive that paging message and pass it along to the eNodeB, and the eNodeB may responsively broadcast the paging message in the manner described above.

In LTE, as discussed above, once the UE receives such a paging message, the UE may respond to the paging message by engaging in a random access process, essentially functioning as a paging response process, to establish (e.g., to restore) a radio-link-layer connection between the UE and the eNodeB.

To facilitate random access in LTE, certain resources on the uplink of each subframe or certain subframes are designated as RACH instances (RACH occasions). Further, as discussed above, the eNodeB (for the coverage area at issue) may have 64 unique preambles that can be used for the initial random access transmission. Thus, in normal practice, a UE seeking to engage in random access might randomly select one of those 64 preambles and transmit the preamble to the eNodeB in any one of the RACH instances.

As further discussed above, however, the eNodeB may reserve certain of those preambles for use to facilitate contention-free random access. For instance, the eNodeB might reserve the first five preambles and may provide a system broadcast message that informs UEs that the available preambles from which to randomly select a preamble for use include just the remaining 59 preambles. That way, other UEs would not engage in random access with any of the reserved, contention-free preambles. When the need arises, however, the eNodeB may assign one of the reserved contention-free preambles to a UE for use by the UE for a limited period of time, during which time no other UE would use that preamble, thus preventing contention.

Typically, a contention-free preamble process would be used for handover, as mentioned above. In particular, when a UE is served by an eNodeB and reports to its serving eNodeB that it has detected strong coverage of another eNodeB (target eNodeB), the serving eNodeB may engage in signaling with the target eNodeB to arrange for handover of the UE to be served by the target eNodeB. In that process, assuming the target eNodeB will grant the handover, the target eNodeB may assign a contention-free preamble for use by the UE and provide that contention-free preamble to the serving eNodeB. The serving eNodeB may then provide that contention-free preamble to the UE in a handover directive (e.g., in an RRC Connection Reconfiguration message to the UE). The UE may then engage in a random-access process with the target eNodeB, to establish a radio-link-layer connection with the target eNodeB, and in this process, the UE may conveniently transmit the provided contention-free preamble to the target eNodeB, avoiding contention with any other access requests at the same time.

In accordance with the present disclosure, however, a paging message that eNodeB 26 transmits to a UE (e.g., broadcasts in the manner discussed above) will carry a contention-free preamble for use by the UE to engage in contention-free random access with that very eNodeB in response to the paging message from the eNodeB. In particular, the eNodeB may select and assign for the UE a contention-free preamble and include that preamble in the paging message that the eNodeB transmits to the UE, so that the UE will receive the contention-free preamble when the UE receives the paging message. Including the contention-free preamble in the paging message in this process can be done by including in the paging message an indication of which preamble the UE should use as a contention-free preamble, such as by specifying a preamble number or the like, or by more expressly including data of the preamble itself. By way of example, the eNodeB may include the preamble in the paging message by adding a field to the paging message that specifies the preamble.

In practice, the eNodeB may add this contention-free preamble into a paging message that the eNodeB receives from another entity, such as from MME 38, before the eNodeB transmits the paging message, including the contention-free preamble, on the air interface for receipt by the UE. For instance, the MME may generate and transmit to the eNodeB a paging message destined to the UE but not including a contention-free preamble. When the eNodeB receives that paging message, the eNodeB may then select a contention-free preamble from its pool of available contention-free preambles, and may modify the received paging message by adding the selected contention-free preamble into the message. The eNodeB may then transmit the paging message, including the added contention-free preamble, to the UE.

To make use of this contention-free preamble, the UE may be configured to read the preamble from the paging message, and to use the preamble to engage in a contention-free random access process with the eNodeB. Thus, once the UE receives the paging message including the contention-free preamble, the UE may read the contention-free preamble from the paging message, and may transmit the contention-free preamble to the eNodeB in any defined RACH instance, so that the eNodeB would receive the contention-free preamble. The random access process would then continue as described above. In particular, upon receipt of the preamble from the UE, the eNodeB would then transmit a corresponding random access response providing a temporary identifier, and the UE would receive that response and then transmit to the eNodeB an RRC Connection Request specifying the UE's actual identity, in response to which the eNodeB may then grant the connection request, thereby establishing a radio-link-layer connection between the UE and the eNodeB. Advantageously by using a contention-free preamble in this process, the UE would likely avoid experiencing access failure, and the eNodeB would likely avoid the need to re-page the UE, thus helping to conserve limited air interface resources.

Figure 3:
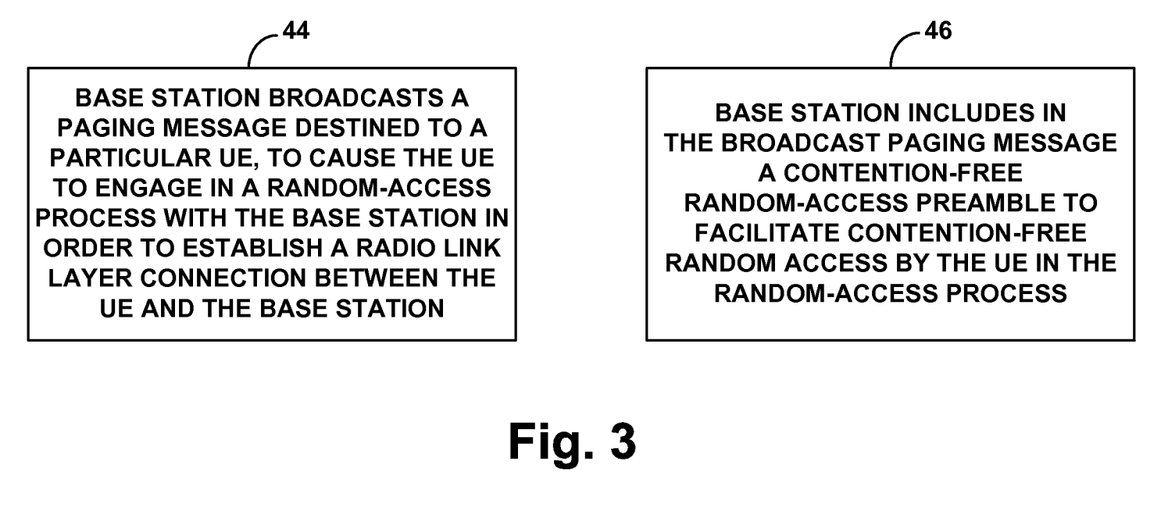
FIG. 3 is a flow chart depicting example functions of a base station in accordance with the disclosure.

FIG. 3 is next a depiction of aspects of this process from the perspective of a base station such as eNodeB 26, that provides a coverage area defining an air interface through which the base station is configured to serve UEs. As shown in FIG. 3, at block 44, the base station broadcasts, over the air interface, a paging message destined to a particular UE, to cause the UE to engage in a random-access process with the base station to establish a radio link layer connection between the UE and the base station. Further, at block 46, which may occur as part of block 44, the base station includes in the broadcast paging message (i.e., includes in the paging message that the base station broadcasts) a contention-free random-access preamble to facilitate contention-free random access by the UE in the random-access process.

In line with the discussion above, in this process, the broadcasting of the paging message may occur when the UE is in a radio-link-layer idle state and not a radio-link-layer connected state. Thus, the broadcasting of the paging message would occur at a time when the UE does not have a radio-link-layer connection with any base station (e.g., when the UE is in the RRC idle state with the base station at issue).

Further, as discussed above, the base station may receive the paging message from a paging controller, i.e., an entity that governs one or more aspects of paging in the network, such as an MME for instance, in which case the act of including the contention-free preamble in the paging message may involve adding the contention-free random-access preamble to the received paging message before broadcasting the paging message, so that the broadcast paging message includes the contention-free random-access preamble. In addition, as further discussed above, the base station may have a pool of contention-free random-access preambles (e.g., for the coverage area at issue), in which case the act of including the contention-free random-access preamble in the broadcast page message may involve selecting the contention-free random-access preamble from the pool of contention-free random-access preambles and including in the broadcast paging message the selected contention-free random-access preamble.

Moreover, the process may additionally involve the base station setting itself to not provide the same contention-free random-access preamble (e.g., in the coverage area at issue) to any other UE for a predefined period of time after broadcasting to the UE the paging message including the contention-free random-access preamble. For instance, as discussed above, the assignment of that preamble to the UE may be for a limited period of time. The base station may thus set timer for that limited period of time, and perhaps specify the time period along with the preamble in the paging message. Once that time period expires, the base station may then freely assign the preamble to another UE instead.

In line with the discussion above, after broadcasting the paging message including the contention-free random-access preamble for the UE, the base station may then receive from the UE the contention-free random-access preamble (e.g., as or in a random-access request, in a RACH instance), defining a response to the paging message. And in response to receipt of that contention-free random access preamble from the UE, the base station may then assign to the UE a first identifier (e.g., a T-CRNTI). Thereafter, the base station may then receive from the UE a radio-link-layer connection request (e.g., RRC connection request) carrying the assigned first identifier. Responsive to the received radio-link-layer connection request, the base station may then assign to the UE a second identifier (e.g., C-RNTI) for use by the UE to engage in further communication over the air interface. In practice, the UE may then use that second identifier such as by providing the identifier with or otherwise in association with radio-link-layer transmissions from the UE to the eNodeB and detecting that identifier in or otherwise in association with radio-link-layer transmissions from the eNodeB to the UE.

Figure 4:
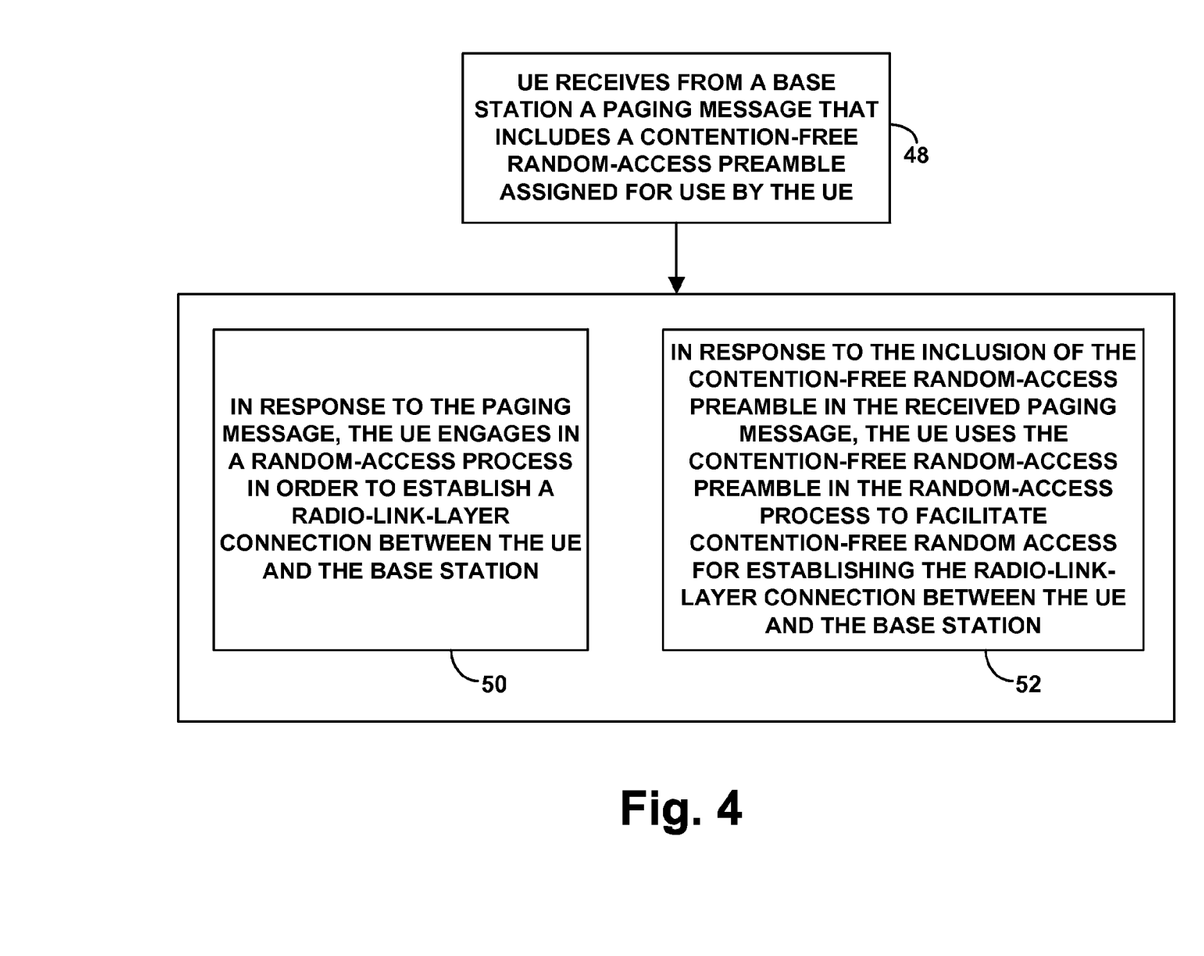
FIG. 4 is a flow chart depicting example functions of a UE in accordance with the disclosure.

FIG. 4 is next a flow chart depicting of aspects of this process from the perspective of a UE such as UE 30. As shown in FIG. 4, at block 48, the UE receives, wirelessly over an air interface (e.g., an LTE air interface) from a base station, a paging message that includes a contention-free random-access preamble assigned for use by the UE. At block 50, in response to the paging message, the UE engages in a random-access process in order to establish a radio-link-layer connection between the UE and the base station. Further, at block 52, in response to the inclusion of the contention-free random-access preamble in the received paging message (i.e., in response to the UE receiving the contention-free random-access preamble in the received paging message), the UE uses the contention-free random-access preamble in the random-access process to facilitate contention-free random access for establishing the radio-link-layer connection between the UE and the base station.

In line with the discussion above, this process may occur when the UE is in a radio-link-layer idle state rather than a radio-link-layer connected state. Further, as discussed above, the random-access process including use of the contention-free random-access preamble may involve (a) transmitting the contention-free random-access preamble to the base station in a random-access instance of the air interface, to initiate the random-access process, (b) after transmitting the contention-free random-access preamble to the base station, receiving from the base station (i) an assignment to the UE of a first identifier and (ii) an assignment to the UE of an uplink resource, (c) responsive to receiving the assignment of the first identifier and the assignment of the uplink resource, using the assigned uplink resource to transmit to the base station a radio-link-layer connection request carrying the assigned first identifier, and (d) after transmitting the radio-link-layer connection request to the base station, receiving from the base station an assignment of a second identifier for use by the UE to engage in further communication over the air interface.

Figure 5:
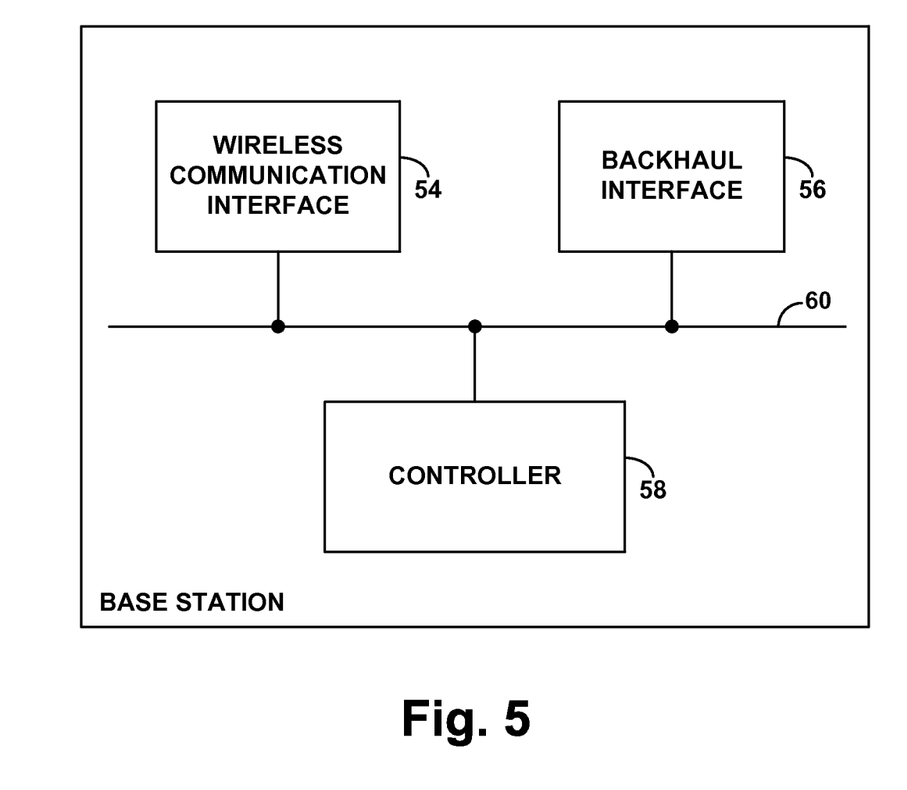
FIG. 5 is a simplified block diagram of an example base station in accordance with the disclosure.

Finally, FIG. 5 is a simplified block diagram of an example base station, such as a base transceiver station, access node, access point, Node-B, or eNodeB, for instance (whether macro, femto, or the like), illustrating some of the components that can be included in such an entity. As shown in FIG. 5, the example base station includes a wireless communication interface 54, a backhaul interface 56, and a controller 58, all of which may be communicatively linked together by a system bus, network, or other connection mechanism 60.

In this arrangement, the wireless communication interface 54 may be configured to engage in air interface communication with served UEs. As such, wireless communication interface 54 may comprise an antenna structure (not shown), which may be tower mounted, and associated components such as a power amplifier and a wireless transceiver, so as to facilitate transmission and reception of bearer and control data over the air interface. Further, backhaul interface 56 may then comprise a wired or wireless interface configured to engage in backhaul communication with various network infrastructure, such as with a paging controller (e.g., MME or switch) for instance.

Controller 58 is then configured to receive, via the backhaul interface, a paging message destined to a particular user equipment device (UE), to add into the received paging message a contention-free random-access preamble, and to broadcast the paging message including the added contention-free random-access preamble, via the wireless communication interface, for receipt of the paging message by the UE. In line with the discussion above, the contention-free random-access preamble provided to the UE in paging message is useable by the UE to engage in a contention-free random access process in order to establish a radio-link-layer connection between the UE and the base station in response to the paging message (e.g., to transition the UE from an RRC idle state to an RRC connected state).

Controller 58 may comprise one or more general purpose processors (e.g., microprocessors) and/or one or more special purpose processors (e.g., application specific integrated circuits) and may be integrated in whole or in part with the wireless communication interface 54 and/or backhaul interface 56 (e.g., on a common chipset or the like). Further, the controller may include data storage (e.g., one or more volatile and/or non-volatile storage components, such as magnetic, optical, or flash storage) holding program instructions executable by the processor(s) to carry out the various base station functions described herein. Alternatively, the controller may take other forms.

In line with the discussion above, the paging message that the base station receives via the backhaul interface may be for a communication to be provided to the UE, such as packet-data arriving from a serving gateway and/or a circuit-switched-fallback call for instance, and the base station may be configured to receive the paging message via the backhaul interface from a paging controller. Further, the base station may broadcast the paging message to the UE when the UE is in a radio-link-layer idle state rather than a radio-link-layer connected state.

As discussed above, the base station may have a pool of contention-free random-access preambles, in which case the controller may be configured to select the contention-free random-access preamble from the pool of contention-free random-access preambles, for the base station to add into the received paging message. Further, the controller may be configured to prevent the base station from providing the same contention-free random-access preamble to any other UE for a predefined period of time after broadcasting to the UE the paging message including the contention-free random-access preamble. For instance, the controller may set the base station to not assign the same contention-free random-access preamble to any other UE for a set period of time.

Further, as discussed above, the controller may be configured to carry out the following steps in order: (i) receive the contention-free random-access preamble from the UE after broadcasting the paging message including the contention-free random-access preamble, (ii) in response to receipt of the contention-free random-access preamble from the UE, assign to the UE a first identifier, (iii) receiving from the UE a radio-link-layer connection request carrying the assigned first identifier, and (iv) in response to receipt of the radio-link-layer connection request from the UE, assign to the UE a second identifier for use by the UE to engage in further air interface communication with the base station.

Exemplary embodiments have been described above. It should be understood, however, that variations from these embodiments are possible, while remaining within the scope of the invention.

We claim:

1. In a wireless communication system comprising a base station configured to serve user equipment devices (UEs) over an air interface, a method comprising:
   broadcasting by the base station, over the air interface, a paging message destined to a particular UE, to cause the UE to engage in a random-access process with the base station to establish a radio link layer connection between the UE and the base station, wherein the paging message is for a circuit-switched-fallback call, and wherein the broadcasting of the paging message occurs when the UE is in a radio-link-layer idle state and not a radio-link-layer connected state;
   including by the base station, in the broadcast paging message, a contention-free random-access preamble to facilitate contention-free random access by the UE in the random-access process;
   after broadcasting the paging message including the contention-free random-access preamble, receiving by the base station from the UE the contention-free random-access preamble as a response to the paging message;
   responsive to receipt by the base station from the UE of the contention-free random-access preamble, assigning by the base station to the UE a first identifier;
   after assigning by the base station to the UE the first identifier, receiving by the base station from the UE a radio-link-layer connection request carrying the assigned first identifier; and
   responsive to the received radio-link-layer connection request, assigning by the base station to the UE a second identifier for use by the UE to engage in further communication over the air interface.

2. The method of claim 1, further comprising:
   receiving, by the base station, from a paging controller, the paging message to be broadcast, wherein the received paging message does not include the contention-free random-access preamble,
   wherein including the contention-free preamble in the paging message comprises adding the contention-free random-access preamble to the received paging message before broadcasting the paging message, so that the broadcast paging message includes the contention-free random-access preamble.

3. The method of claim 1, wherein the base station has a pool of contention-free random-access preambles, and wherein including in the broadcast page message the contention-free random-access preamble comprises:
   selecting the contention-free random-access preamble from the pool of contention-free random-access preambles; and
   including in the broadcast paging message the selected contention-free random-access preamble.

4. The method of claim 1, further comprising the base station setting itself to not provide the same contention-free random-access preamble to any other UE for a predefined period of time after broadcasting to the UE the paging message including the contention-free random-access preamble.

5. The method of claim 1, wherein receiving the contention-free random-access preamble from the UE comprises receiving the contention-free random-access preamble in a random-access-channel instance of the air interface.

6. The method of claim 1, wherein the air interface is a Long Term Evolution (LTE) air interface.

7. A method comprising:
   receiving into a user equipment device (UE), wirelessly over an air interface from a base station, a paging message that includes a contention-free random-access preamble, wherein the paging message is for a circuit-switched-fallback call, and wherein the receiving of the paging message occurs when the UE is in a radio-link-layer idle state and not a radio-link-layer connected state;
   responsive to the paging message, engaging by the UE in a random-access process to establish a radio-link-layer connection between the UE and the base station; and
   responsive to inclusion of the contention-free random-access preamble in the received paging message, using by the UE the contention-free random-access preamble in the random-access process to facilitate contention-free random access for establishing the radio-link-layer connection between the UE and the base station,
   wherein engaging in the random-access process including use the contention-free random-access preamble comprises (a) transmitting the contention-free random-access preamble to the base station in a random-access instance of the air interface, to initiate the random-access process, (b) after transmitting the contention-free random-access preamble to the base station, receiving from the base station (i) an assignment to the UE of a first identifier and (ii) an assignment of an uplink resource, (c) responsive to receiving the assignment of the first identifier and the assignment of the uplink resource, using the assigned uplink resource to transmit to the base station a radio-link-layer connection request carrying the assigned first identifier, and (d) after transmitting the radio-link-layer connection request to the base station, receiving from the base station an assignment of a second identifier for use by the UE to engage in further communication over the air interface.

8. The method of claim 7, wherein the air interface is a Long Term Evolution (LTE) air interface.

9. A base station comprising:
a wireless communication interface configured to engage in air interface communication;
a backhaul interface configured to engage in backhaul communication; and
a controller configured to receive, via the backhaul interface, a paging message destined to a particular user equipment device (UE), to add into the received paging message a contention-free random-access preamble, and to broadcast the paging message including the added contention-free random-access preamble, via the wireless communication interface, for receipt of the paging message by the UE,
wherein the paging message is for a circuit-switched-fallback call,
wherein the broadcasting of the paging message occurs when the UE is in a radio-link-layer idle state rather than a radio-link-layer connected state,
wherein the contention-free random-access preamble is useable by the UE to engage in a contention-free random access process to establish a radio-link-layer connection between the UE and the base station in response to the paging message, and
wherein the controller is configured to carry out the following steps in order: (i) receive the contention-free random-access preamble from the UE after broadcasting the paging message including the contention-free random-access preamble, (ii) in response to receipt of the contention-free random-access preamble from the UE, assign to the UE a first identifier, (iii) receiving from the UE a radio-link-layer connection request carrying the assigned first identifier, and (iv) in response to receipt of the radio-link-layer connection request from the UE, assign to the UE a second identifier for use by the UE to engage in further air interface communication with the base station.

10. The base station of claim 9, wherein the wireless communication interface comprises an antenna structure and a wireless transceiver.

11. The base station of claim 9, wherein the controller is configured to receive the paging message via the backhaul interface from a paging controller.

12. The base station of claim 9, wherein the base station further has a pool of contention-free random-access preambles, and wherein the controller is configured to select the contention-free random-access preamble from the pool of contention-free random-access preambles, for adding into the received paging message.

13. The base station of claim 9, wherein the controller is configured to prevent the base station from providing the same contention-free random-access preamble to any other UE for a predefined period of time after broadcasting to the UE the paging message including the contention-free random-access preamble.

* * * * *